United States Patent [19]
Shibanushi

[11] Patent Number: 5,987,820
[45] Date of Patent: Nov. 23, 1999

[54] GLASS HOLDER

[75] Inventor: Yoshio Shibanushi, Shizuoka, Japan

[73] Assignee: Nifco, Inc., Japan

[21] Appl. No.: 08/866,218

[22] Filed: May 30, 1997

[30] Foreign Application Priority Data

Jun. 7, 1996 [JP] Japan ..................................... 8-146196

[51] Int. Cl.⁶ .......................................................... B60J 1/16
[52] U.S. Cl. .............................................. 49/375; 49/358
[58] Field of Search ............................ 49/374–376, 351, 49/358; 16/252

[56] References Cited

U.S. PATENT DOCUMENTS

| | | |
|---|---|---|
| 4,575,967 | 3/1986 | Bickerstaff . |
| 4,803,756 | 2/1989 | Hufnagel ..................................... 16/252 |
| 4,986,030 | 1/1991 | Bertolini et al. ........................ 49/375 X |
| 4,991,351 | 2/1991 | Bertolini . |
| 5,009,461 | 4/1991 | Smith-Horn et al. .................. 49/502 X |
| 5,079,798 | 1/1992 | Burke et al. ............................... 16/252 |

FOREIGN PATENT DOCUMENTS

| | | |
|---|---|---|
| 54-99215 | 7/1979 | Japan . |
| 55-1261 | 1/1980 | Japan . |
| 774216 | 5/1957 | United Kingdom . |
| 861786 | 2/1961 | United Kingdom . |
| 1410680 | 10/1975 | United Kingdom . |

*Primary Examiner*—Daniel P. Stodola
*Assistant Examiner*—Hugh B. Thompson
*Attorney, Agent, or Firm*—Parkhurst & Wendel, L.L.P

[57] ABSTRACT

A glass holder mounted to a raising/lowering member of a window regulator of an automobile and holding a window glass, comprising: a holding member which holds the window glass; a mounting member mounted to the raising/lowering member; and a connecting structure for connecting the holding member to the mounting member such that the holding member is rotatable with respect to the mounting member.

13 Claims, 10 Drawing Sheets

GLASS HOLDER

BACKGROUND OF THE INVENTION

1. Field of the Invention

The present invention relates to a glass holder which is mounted to a window regulator of an automobile and holds a window glass.

2. Description of the Related Art

Figure 7:
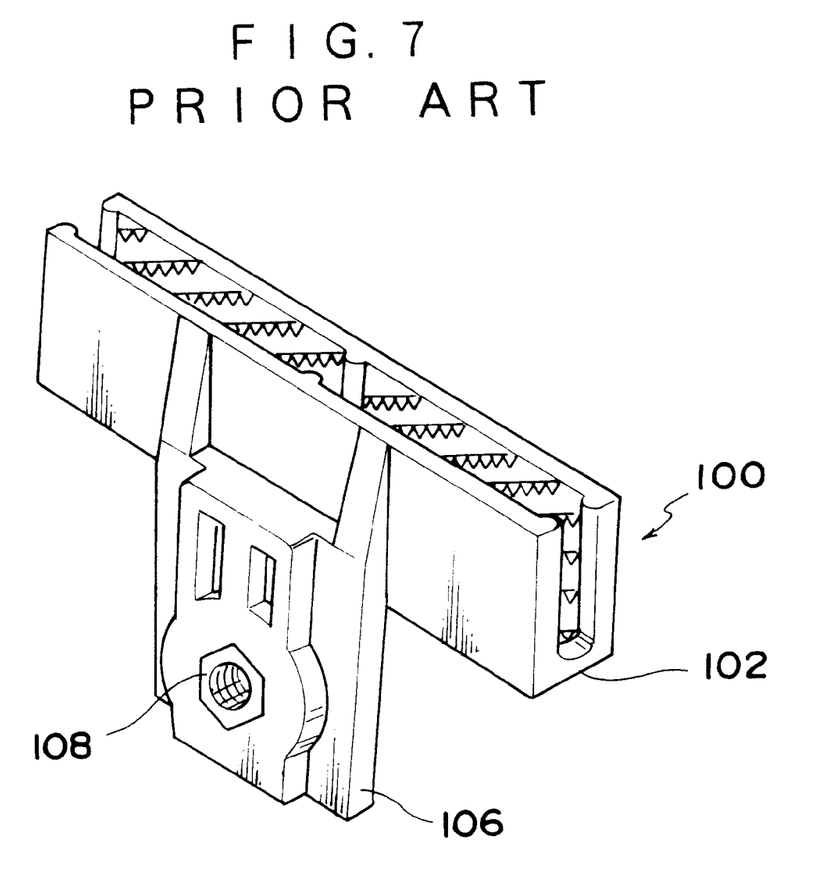
FIG. 7 is a perspective view of a conventional glass holder.

The structure illustrated in FIG. 7 is a conventional glass holder 100. (Refer to Japanese Utility Model Application Publication (JP-Y) No. 55-1261.)

Figure 8:
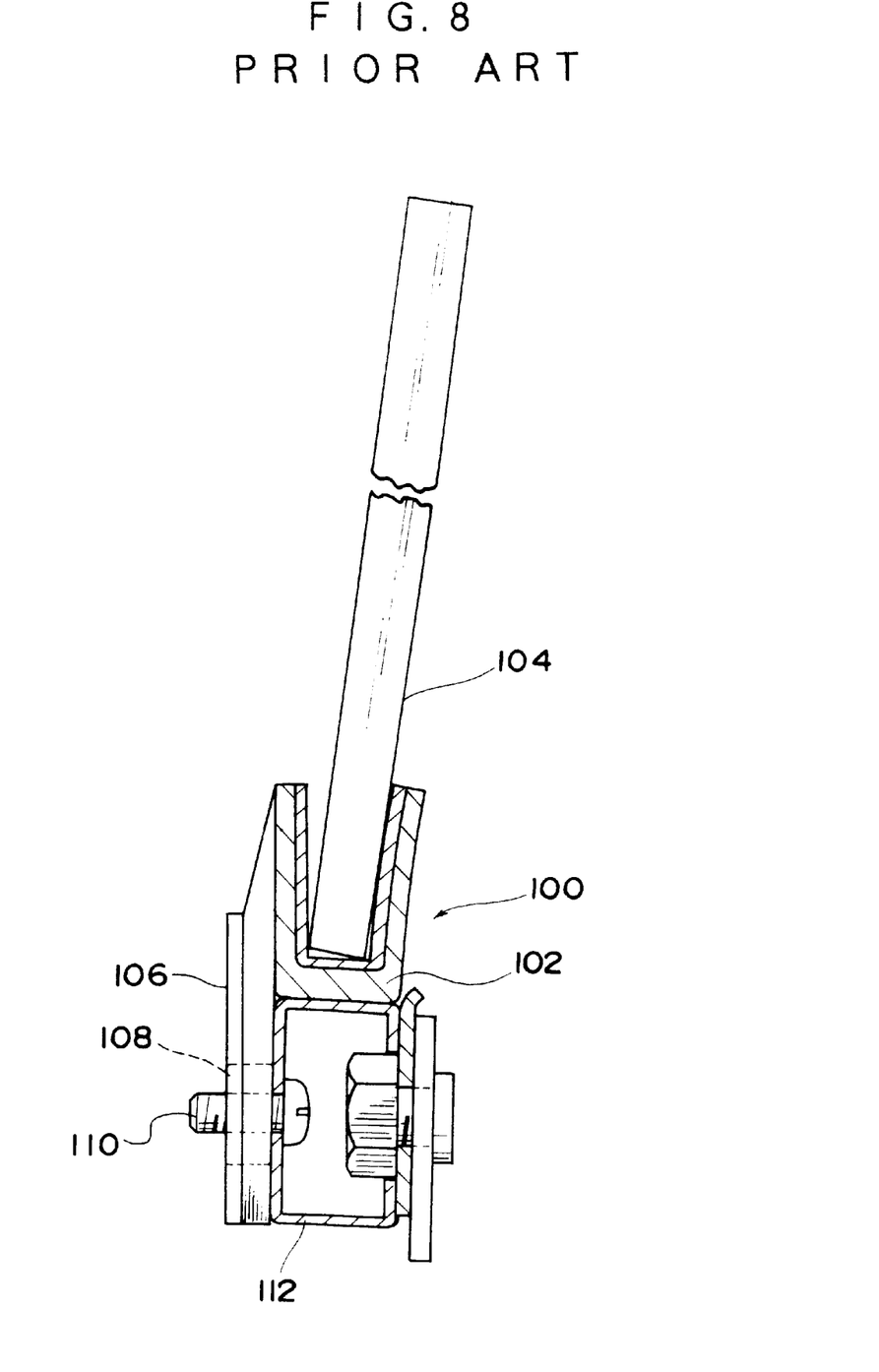
FIG. 8 is a cross-sectional view illustrating a state of usage of the conventional glass holder.

The glass holder 100 has a U-shaped groove member 102 having a substantially U-shaped cross-section. A window glass 104 (see FIG. 8) is nipped in the U-shaped groove member 102. A vertical portion 106 extends from the U-shaped groove member 102, and a nut 108 is embedded in the vertical portion 106. The glass holder 100 is mounted to a roller guide 112 of a window regulator by a screw 110 being screwed into the nut 108 as illustrated in FIG. 8.

The door panel of an automobile is curved in the vertical direction. Because the window glass 104 tilts bit-by-bit as it is being raised along a guide groove, the locus of movement of the window glass 104 is a curve. However, because the glass holder 100 mounted to the window regulator is raised and lowered linearly within the door panel, the locus of movement of the glass holder 100 is a straight line. Accordingly, when the window glass 104 is raised, as illustrated in FIG. 8, the window glass 104 tilts. There is the concern that, due to this tilting, a wrenching force may act on the U-shaped groove member 102 and damage the glass holder 100.

Further, when attempts are made to eliminate the wrenching force which is caused by the offset between the locus of movement of the window glass 104 and the locus of movement of the glass holder 100, a drawback arises in that the mechanism of the window regulator becomes complex.

SUMMARY OF THE INVENTION

In view of the aforementioned, an object of the present invention is to provide a glass holder which can follow the movement of a window glass, without there being the need to make any improvements to the mechanism of the window regulator.

A first aspect of the present invention is a glass holder mounted to a raising/lowering member of a window regulator of an automobile and holding a window glass, comprising: a holding member which holds the window glass; a mounting member mounted to the raising/lowering member; and connecting means for connecting the holding member to the mounting member such that the holding member is rotatable with respect to the mounting member.

The holding member holds the window glass, and the mounting member is mounted to the window regulator. The holding member and the mounting member are connected by the connecting means. Accordingly, when the window regulator is operated, the window glass is raised or lowered via the glass holder.

In a case in which the door panel of the automobile is curved, as the window glass is raised, the upper portion of the window glass tilts toward the inner side of the vehicle bit-by-bit. As a result, the locus of movement of the window glass is a circular arc shaped curve. In contrast, the window regulator is raised straight up along a straight line. Therefore, the locus of movement of the glass holder, which is mounted to the raising/lowering member of the window regulator, is a straight line. Accordingly, there is offset between the locus of movement of the window glass and the locus of movement of the glass holder. Due to this offset, wrenching force begins to be applied to the glass holder.

However, the holding member of the glass holder is, by the connecting means, connected to the mounting member so as to be rotatable with respect to the mounting member. As a result, the wrenching force caused by the offset between the locus of movement of the window glass and the locus of movement of the glass holder is eliminated, and the glass holder can follow the movement of the window glass. Therefore, the glass holder is not damaged.

The second aspect of the present invention is a glass holder in which, in the first aspect of the invention, the connecting means has rings which are formed at at least one of the holding member and the mounting member, and a shaft rotatably supported by the rings.

More specifically, when the rings are formed at the holding member, the shaft is formed at the mounting member and is rotatably supported by the rings. Further, when the rings are formed at the mounting member, the shaft is formed at the holding member and is rotatably supported by the rings. When the rings are formed at both the holding member and the mounting member, the shaft is formed as a member separate from the holding member and the mounting member and is rotatably supported by the rings. Accordingly, in any case, the holding member is connected rotatably and securely to the mounting member by the rings and the shaft. Therefore, even if tensile force is applied to the holding member and the mounting member, the holding member and the mounting member do not separate from one another.

The third aspect of the present invention is a glass holder in which, in the first aspect, the connecting means has rings formed at one of the holding member and the mounting member, and a shaft formed at the other of the holding member and the mounting member and passing through the rings. The holding member has a holding portion which holds the window glass at a position apart from the connecting means. Further, the mounting member extends in a direction of moving away from the connecting means, and has a mounting plate which is mounted to the raising/lowering member. The mounting plate has a mounting hole. A mounting bolt mounted to the raising/lowering member passes through the mounting hole.

First, after the holding portion of the holding member holds the window glass, the mounting bolt is inserted into the mounting hole of the mounting plate, and the mounting member is mounted to the raising/lowering member of the window regulator. In the state in which the window glass is held by the holding member, the holding member rotates about the shaft due to the weight of the window glass, and may be unsteady. Therefore, a worker must carry out the mounting operation while pressing the shaft and the rings with his/her hands. Here, for example, if the shaft and the mounting hole through which the mounting bolt is inserted are close to one another, when the worker presses the shaft or the like with his/her hands, the mounting hole is hidden by the worker's hands and cannot be seen easily, which hinders the mounting operation. However, in the glass holder of the third aspect, the mounting hole is formed in the mounting plate which extends in a direction of moving away from the connecting means. The mounting bolt is passed through the mounting hole so that the mounting plate is mounted to the raising/lowering member. As a result, even if a worker presses the shaft or the like with his/her hands when mounting the mounting member to the raising/lowering member, the mounting hole is not hidden from view by the worker's hands, and the mounting operation is easy to carry out.

The fourth aspect of the present invention is a glass holder in which the glass holder of either the second or third aspect of the present invention also has receiving portions contacting the rings and receiving load of the rings. Because the second aspect of the invention states that the rings may be on either the holding member or the mounting member, and the third aspect of the invention states that the rings are on both the mounting member and the holding member, the receiving portions may be situated on either the upper portion (of the holding member) to support the rings on the mounting member, or on the lower portion (of the mounting member), to support the rings on the holding member.

Accordingly, a portion of the load of the window glass is applied to the mounting member from the holding member via the rings and the shafts. The remainder of the load is applied to the mounting member from the holding member via the rings and the receiving portions. Namely, the load of the window glass is dispersed between the shaft and the receiving portions such that less load is applied to the shaft. As a result, damage to the shaft is prevented.

A fifth aspect of the present invention is a glass holder in which, in the first aspect, the connecting means has holding rings formed at the holding member and a shaft rotatably supported by the holding rings. The holding member has a holding portion which holds the window glass at a position apart from the connecting means. Further, the mounting member has a mounting portion which is formed such that the axis of the shaft passes therethrough and which is mounted to the raising/lowering member. The mounting portion has a mounting hole. A mounting bolt mounted to the raising/lowering member passes through the mounting hole.

The mounting portion is formed on the axis of the shaft which is rotatably supported by the holding rings. The mounting hole through which the mounting bolt passes is formed in the mounting portion. In this way, the glass holder can be made smaller. As a result, even if there is only a small space, the glass holder can be mounted to the window regulator, and the window glass can be held.

Because the present invention is structured as described above, the effects that the glass holder can follow the movement of the window glass and the glass holder is not damaged due to wrenching force can be achieved without improving the structure of the window regulator.

DESCRIPTION OF THE PREFERRED EMBODIMENTS

Figure 1:
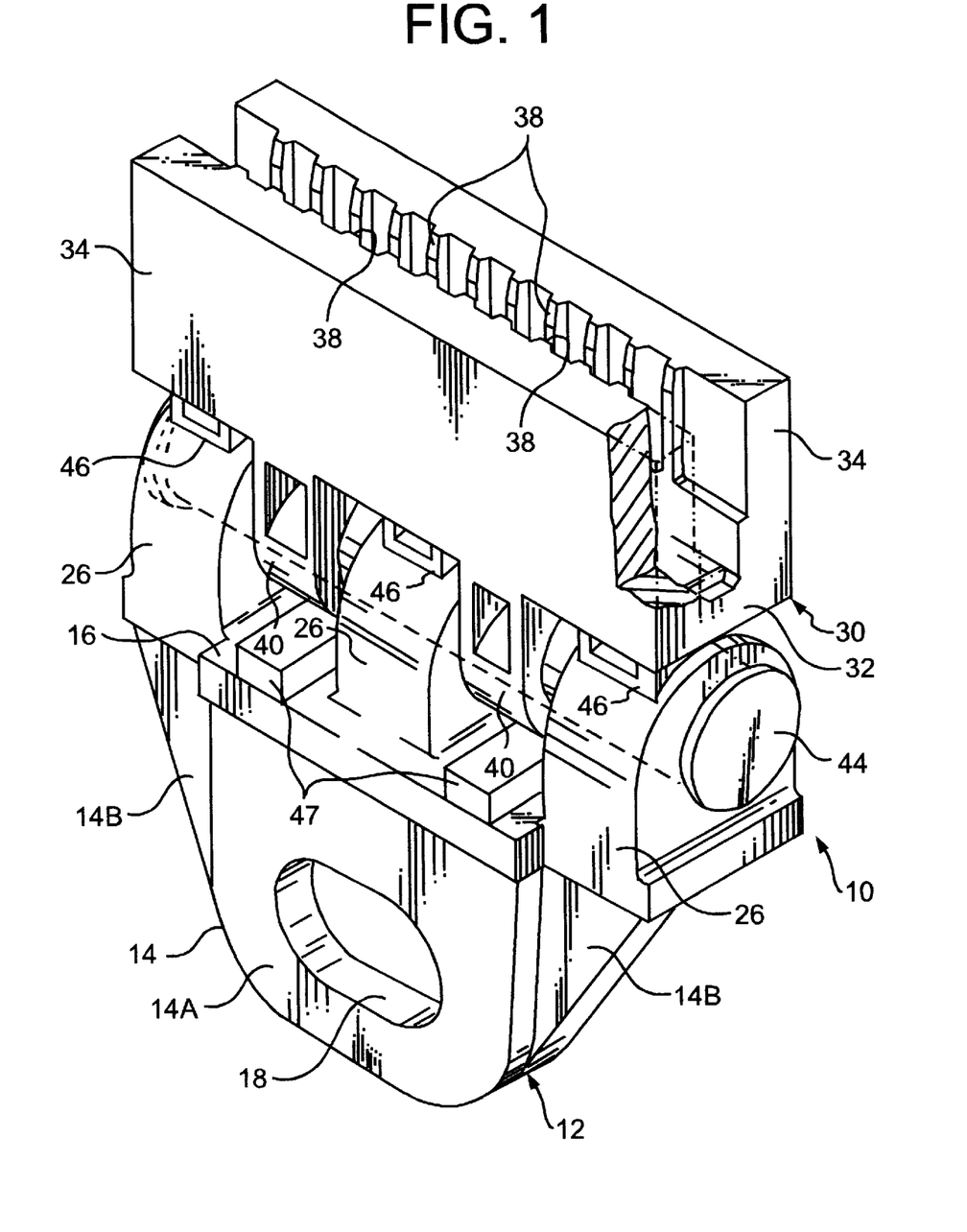
FIG. 1 is a perspective view of a glass holder relating to a first embodiment of the present invention.
Figure 2:
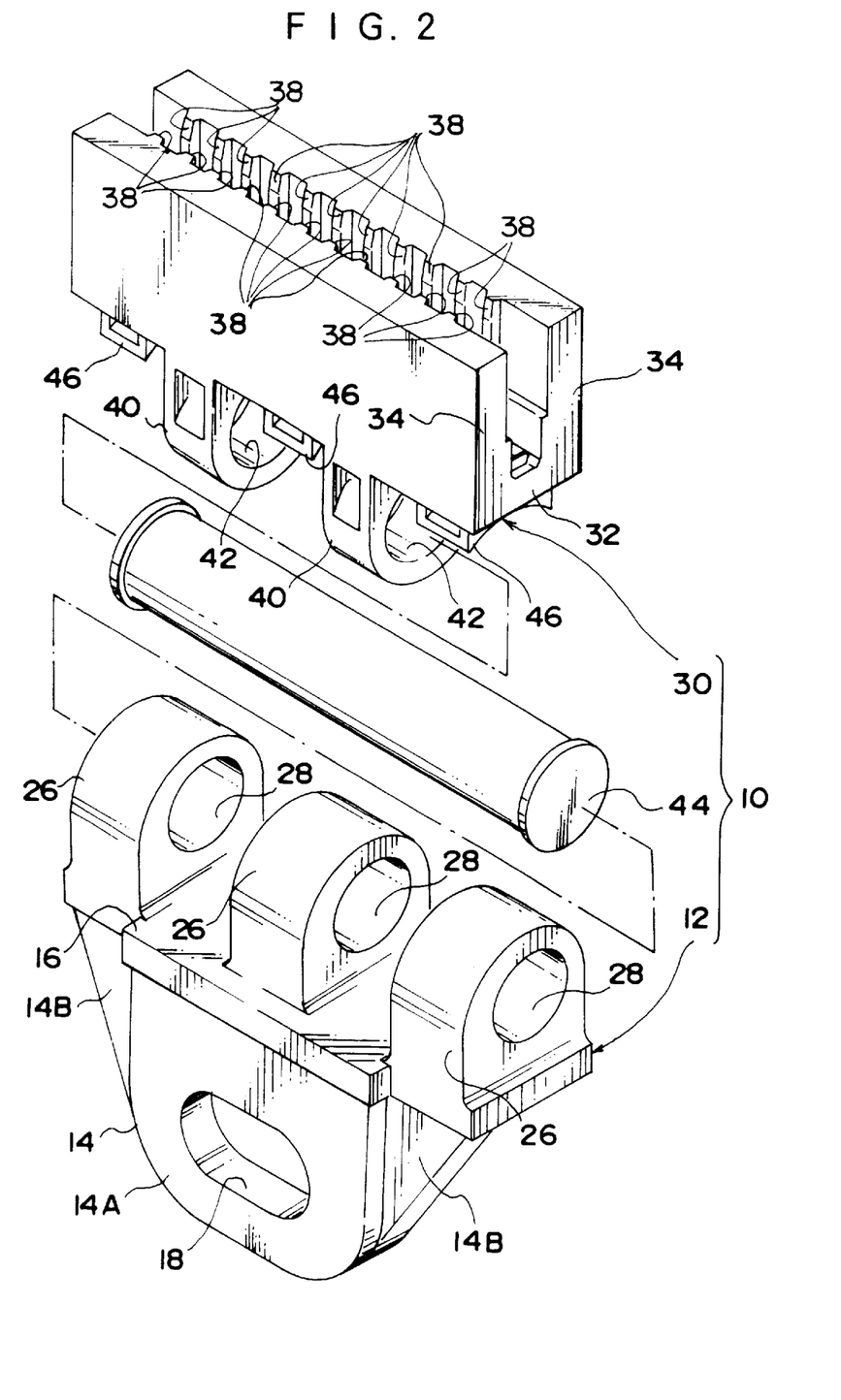
FIG. 2 is an exploded perspective view of the glass holder relating to the first embodiment of the present invention.

As illustrated in FIGS. 1 and 2, a glass holder 10 relating to a first embodiment of the present invention includes a mounting plate 14, which is substantially shaped as an upside-down stand as seen in front view, and a support plate 16, which is formed from the upper end of the mounting plate 14 such that the surface direction of the support plate 16 is substantially orthogonal to that of the mounting plate 14.

Figure 3:
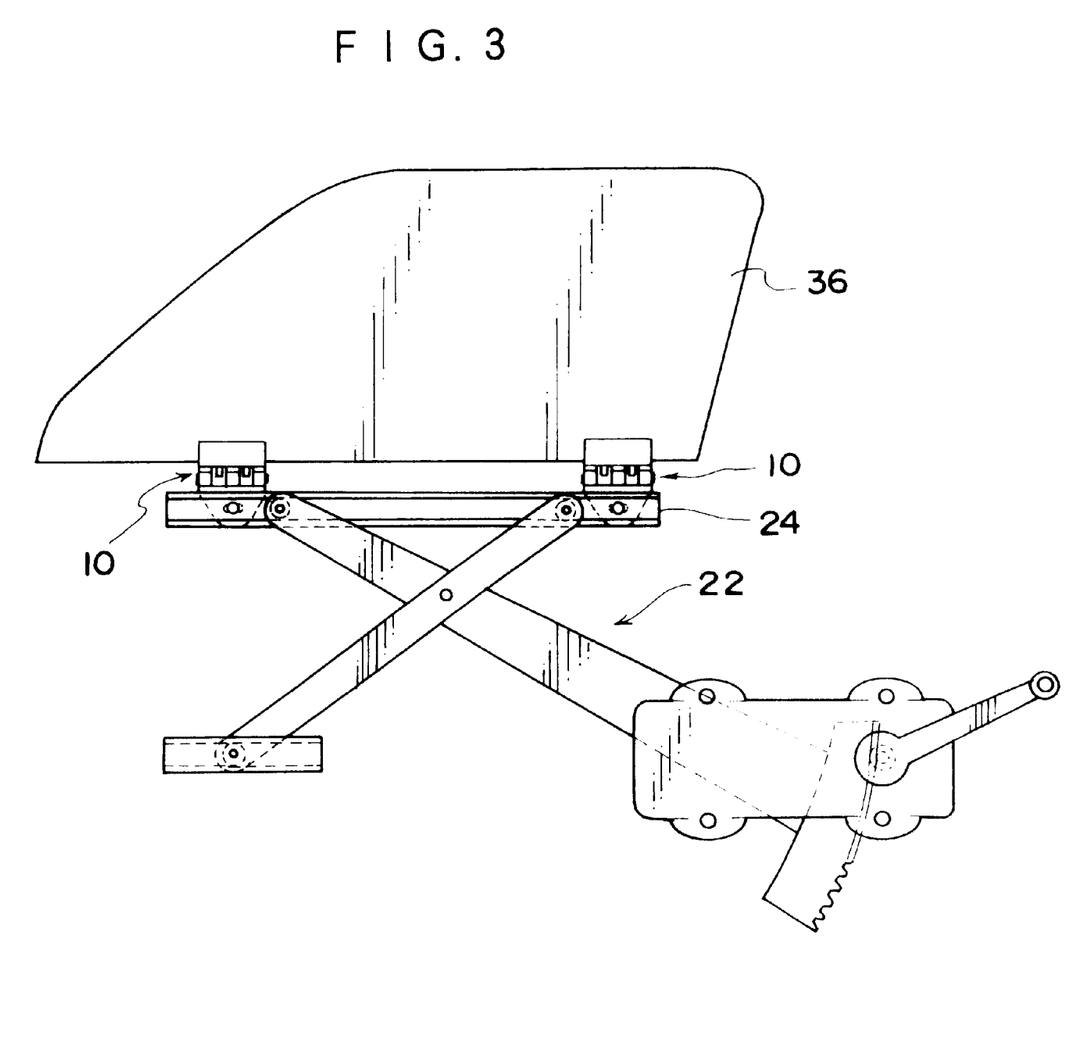
FIG. 3 is a side view illustrating a mounted state of the glass holder relating to the first embodiment of the present invention.
Figure 4:
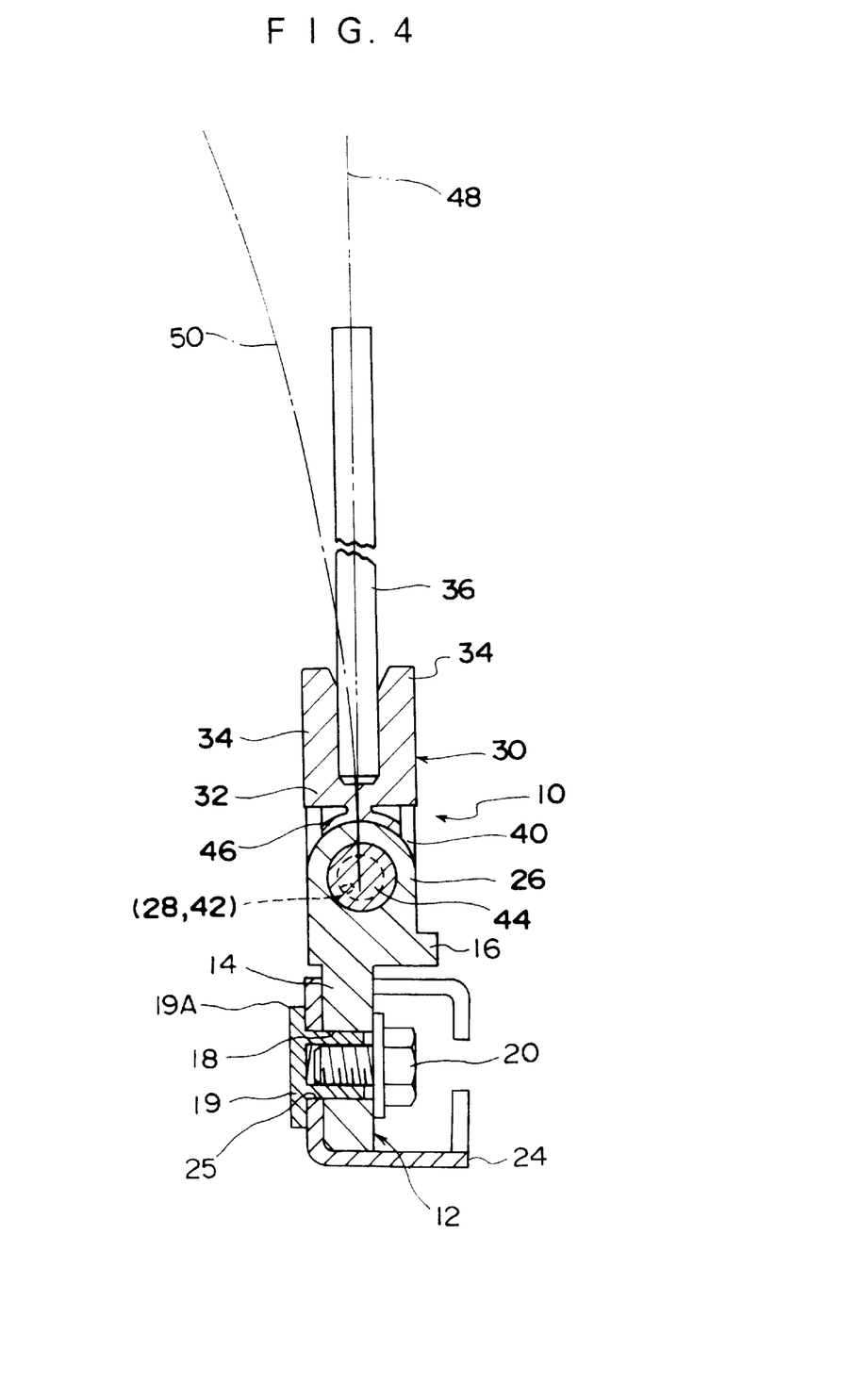
FIG. 4 is a cross-sectional view illustrating a state of usage of the glass holder relating to the first embodiment of the present invention.

A central portion 14A as seen in plan view of the mounting plate 14 is formed thicker than side portions 14B of the mounting plate 14, and is therefore strong. An elongated mounting hole 18 is formed in the central portion 14A. As illustrated in FIG. 4, the mounting hole 18 and a mounting hole 25 of a roller guide 24 of a window regulator 22 (see FIG. 3) are aligned, and a cylindrical fastener 19 is inserted therethrough from the mounting hole 25 side. Then, a flange 19A of the fastener 19 is welded to the roller guide 24. Subsequently, a mounting bolt 20 is screwed into a female screw formed in the fastener 19. In this way, the glass holder 10 is mounted to the roller guide 24.

Lower rings 26 are formed at the widthwise direction central portion and the widthwise direction end portions of the support plate 16. Shaft supporting holes 28 are formed in the lower rings 26 such that the axial direction thereof is the widthwise direction of the mounting plate 14. The upper surfaces of the lower rings 26 are curved in substantially cylindrical shapes. A shaft 44 which will be described later is inserted through the shaft supporting holes 28.

The glass holder 10 includes a holding member 30 having a substantially U-shaped cross-section and formed by a bottom plate 32 and a pair of parallel side plates 34 which are formed upright at the ends in the widthwise direction of the bottom plate 32 (i.e., the longer end portions of the bottom plate 32). As illustrated in FIG. 4, a window glass 36 is held by the holding member 30 by being nipped between the side plates 34. A plurality of clamping walls 38 are formed at the inner side surfaces of the side plates 34 vertically (i.e., in the direction in which the side plates 34 rise from bottom plate 32). The clamping walls 38 are strongly press-contacted with the surfaces of the window glass 36 due to the distal ends of the clamping walls 38 being bent slightly, and the clamping walls 38 thereby reliably hold the window glass 36.

Upper rings 40 are formed at the bottom surface of the bottom plate 32 along the longitudinal direction thereof. Shaft supporting holes 42, whose axial directions substantially coincide, are formed in the upper rings 40. The diameters of the shaft supporting holes 42 are substantially the same as the diameters of the shaft supporting holes 28. As illustrated in FIG. 1, the upper rings 40 enter into the spaces between the lower rings 26 such that the upper rings 40 and lower rings 26 mesh together. In this state, the shaft supporting holes 42 formed in the upper rings 40 and the shaft supporting holes 28 formed in the lower rings 26 coincide, as do the axes of the shaft supporting holes 42 and the shaft supporting holes 28. By passing the shaft 44 through the shaft supporting holes 42 and the shaft supporting holes 28 which are aligned in this way, a hinge structure is formed such that the upper rings 40 and the lower rings 26 are rotatably connected. Therefore, even if tensile force and/or torsional force is applied between the holding member 30 and the mounting member 12, the holding member 30 and the mounting member 12 do not separate from one another.

The shaft 44 is formed in a cylindrical shape which is able to pass through the shaft supporting holes 42 and the shaft supporting holes 28. After the shaft 44 is passed through the shaft supporting holes 42 and the shaft supporting holes 28, the diameters of the ends thereof are enlarged by working so that the shaft 44 does not come out of the shaft supporting holes 42 and the shaft supporting holes 28.

Receiving portions 46 are formed at the bottom plate 32 of the holding member 30 at positions corresponding to the upper surfaces of the lower rings 26. The lower surfaces of the receiving portions 46 are curved concavely in correspondence with the curving of the upper surfaces of the lower rings 26. As a result, a illustrated in FIG. 5, even when the holding member 30 rotates about the shaft 44 with respect to the mounting member 12, the bottom surfaces of the receiving portions 46 plane-contact the upper surfaces of lower rings 26 regardless of the angle of tilting of the mounting member 12 with respect to the holding member 30. Lower receiving portions 47, as shown in FIG. 1, are formed on the top of the support plate 16 to support the upper rings 40 and to equalize the distribution of force on the shaft.

Next, the method of mounting the glass holder 10 relating to the present first embodiment to the roller guide 24 of the window regulator 22 so as to hold the window glass 36, and the operation of the glass holder 10 will be described.

First, and adhesive is applied to the inner side surfaces of the side plates 34. Next, the window glass 36 is inserted between the side plates 34. The clamping walls 38 crimp the surfaces of the window glass 36 so as to reliably nip the window glass 36. The window glass 36 is strongly fixed to the holding member 30 by the adhesive.

Next, the mounting hole 18 and the mounting hole 25 are aligned, and the fastener 19 is inserted therethrough from the mounting hole 25 side. The flange 19A is welded to the roller guide 24 and the mounting bolt 20 is screwed in from the mounting hole 18 side so that the glass holder 10 is mounted to the roller guide 24.

At this time, because the window glass 36 is already fixed to the holding member 30, the holding member 30 inadvertently rotates around the shaft 44 due to the weight of the window glass 36, and is unsteady. In order to prevent such unsteadiness, the worker is to grasp the shaft 44, the upper rings 40 and the lower rings 26 with his/her hands.

Here, because the mounting hole 18 is formed in the mounting plate 14, the mounting hole 18 is positioned at a position apart from the shaft 44. Accordingly, even if a worker grasps the shaft 44, the upper rings 40 and the lower rings 26 with his/her hands, the mounting hole 18 is not hidden by the worker's hands. As a result, the mounting bolt 20 can easily be inserted through the mounting hole 18, and the mounting operation can be carried out smoothly. A nut is screwed together with the mounting bolt 20 so that the roller guide 24 can be mounted securely and reliably to the mounting plate 14. Further, because the mounting hole 18 is an elongated hole, even if the position of mounting the glass holder 10 to the window glass 36 is offset slightly, appropriate adjustments can be made.

When the window regulator 22 is operated, the roller guide 24 is raised or lowered, and accordingly, the glass holder 10 is raised or lowered. Therefore, the window glass 36 is raised or lowered.

The door panel of an automobile curves toward the vehicle body from bottom to top. Accordingly, as illustrated by the one-dot chain line in FIG. 4, a locus of movement 50 of the window glass 36 is a circular arc shaped curve, and due to the raising of the window glass 36, the window glass 36 tilts bit-by-bit toward the inner side of the vehicle (see FIG. 5). However, the roller guide 24 of the window regulator 22 rises straight up linearly within the door panel, and a locus of movement 48 of the glass holder 10 is a straight line as illustrated by the two-dot chain line. As a result, there is offset between the locus of movement 50 of the window glass 36 and the locus of movement 48 of the glass holder 10. Due to this offset, a wrenching force in the direction of arrow A acts on the glass holder 10.

Figure 5:
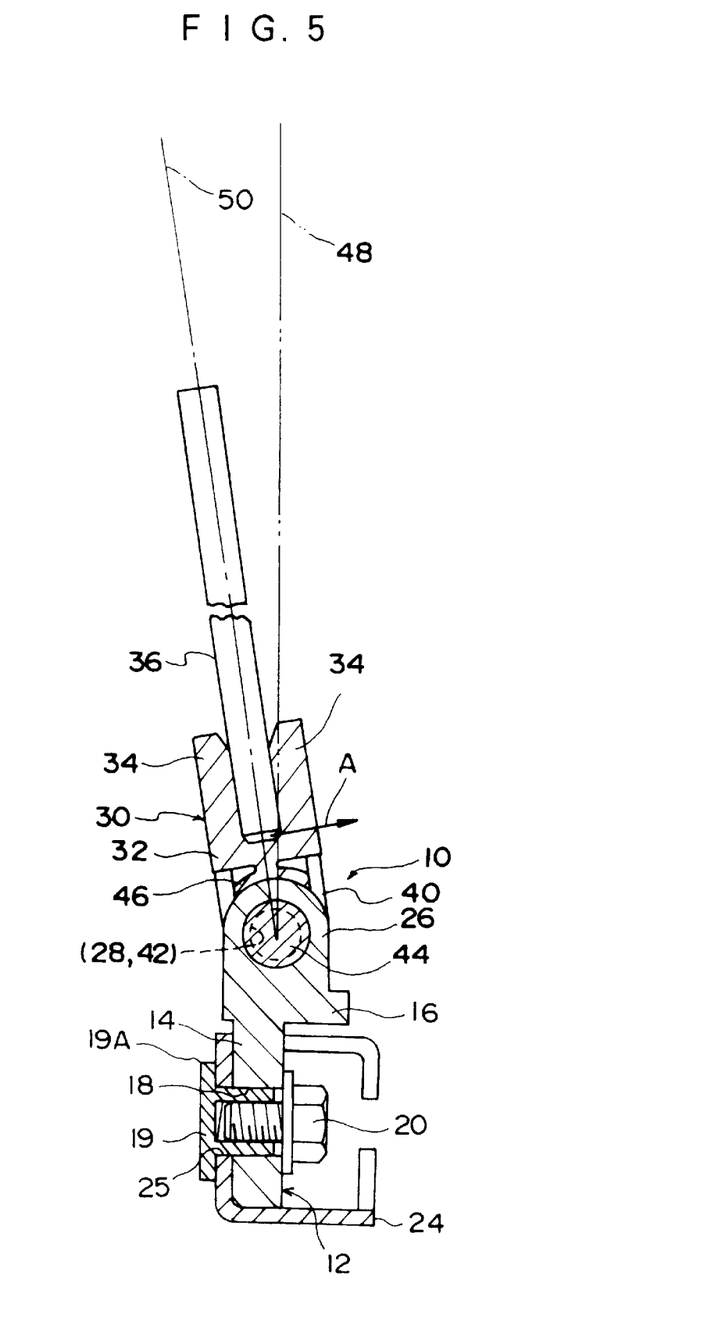
FIG. 5 is a cross-sectional view illustrating a state of usage of the glass holder relating to the first embodiment of the present invention.

However, as illustrated in FIG. 5, the mounting member 12 and the holding member 30 of the glass holder 10 are rotatable about the shaft 44. As a result, the wrenching force caused by the offset between the locus of movement 50 of the window glass 36 and the locus of movement 48 of the glass holder 10 is eliminated, and the glass holder 10 follows the movement of the window glass 36. As a result, wrenching force is not applied to the glass holder 10, and the side plates 34 are not pushed open excessively such that the glass holder 10 is damaged as in the conventional structure (see FIG. 8).

A portion of the load of the window glass 36 is transmitted to the lower rings 26 from the holding member 30 via the upper rings 40 and the shaft 44. In addition to this way in which load is applied, load is also transmitted from the holding member 30 to the lower rings 26 via the receiving portions 46. Accordingly, the load of the window glass 36 is dispersed, and only a portion thereof is applied to the shaft 44. As a result, not all of the load of the window glass 36 is applied to the shaft 44, and damage to the shaft 44 is prevented.

Figure 10:
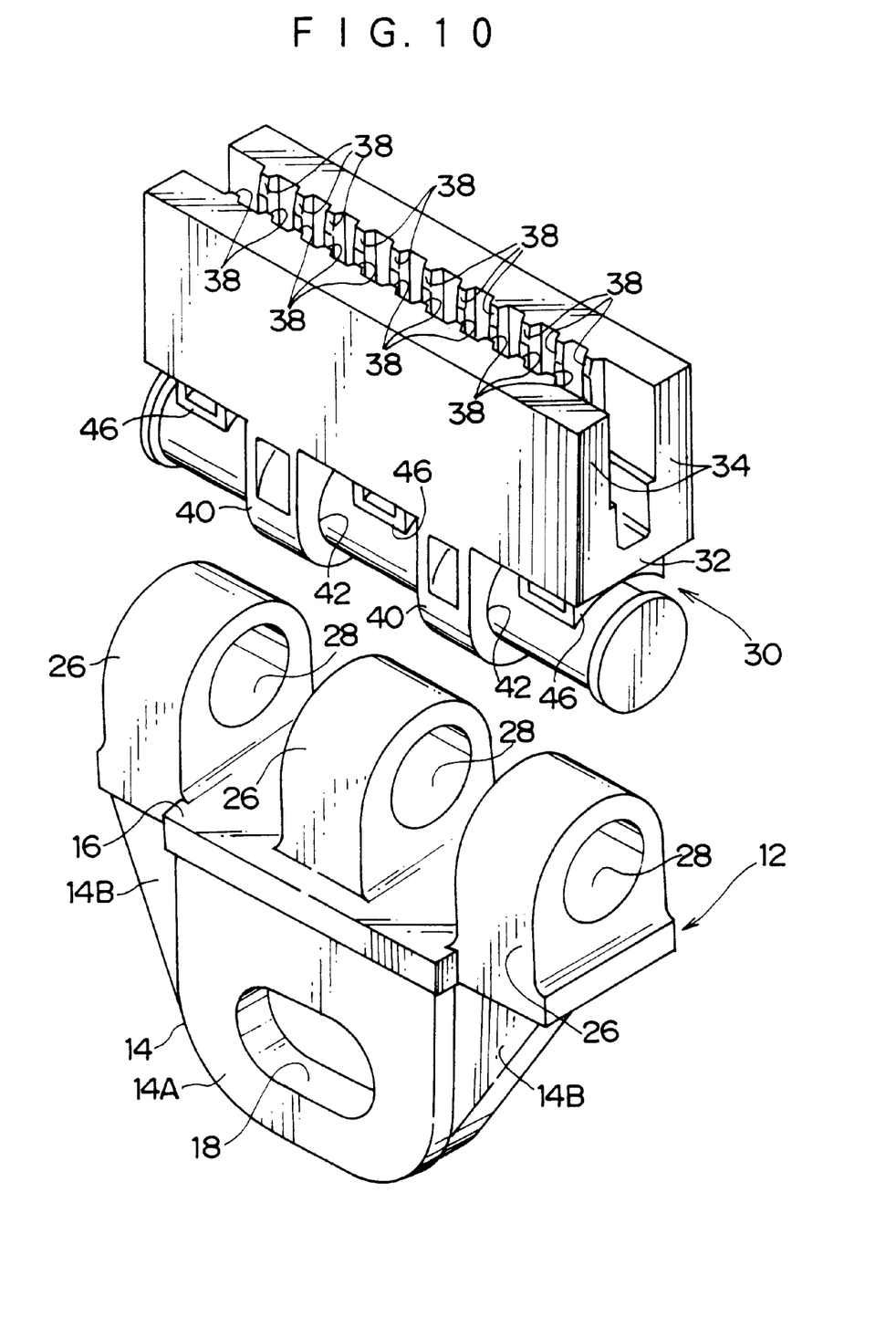
FIG. 10 is an exploded perspective view of a glass holder relating to a variant example of the first embodiment of the present invention.

In the present first embodiment, the upper rings 40 and the shaft 44 are provided as separate members, and in a process thereafter, the shaft 44 is inserted through the shaft supporting holes 42 of the upper rings 40 and the shaft supporting holes 28 of the lower rings 26. However, the method of forming the glass holder is not limited to the same. For example, as illustrated in FIG. 10, the shaft 44 may be formed integrally with the upper rings 40 in advance. Next, the holding member 30 is inserted into a mold, and the mounting member 12 is insert-molded such that the shaft 44 passes through the shaft supporting holes 28 of the lower rings 26. In this way, because the upper rings 40 and the shaft 44 are formed integrally, the strength of the glass holder 10 against tensile force can be increased even more.

Figure 6:
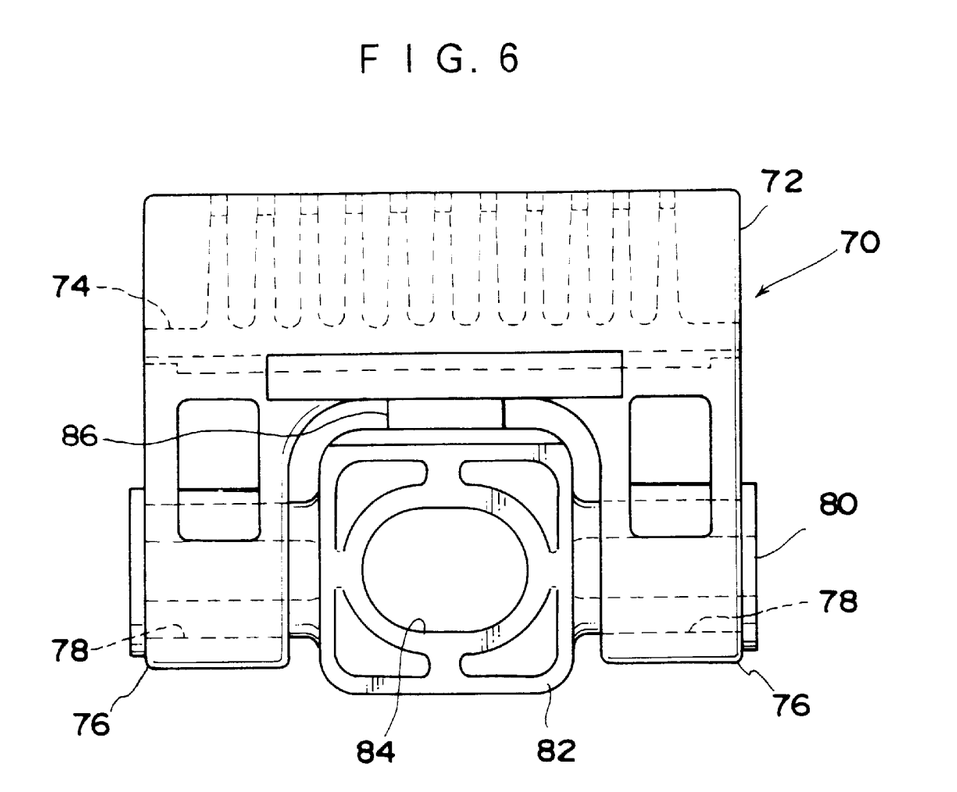
FIG. 6 is a front view of a glass holder relating to a second embodiment of the present invention.
Figure 9:
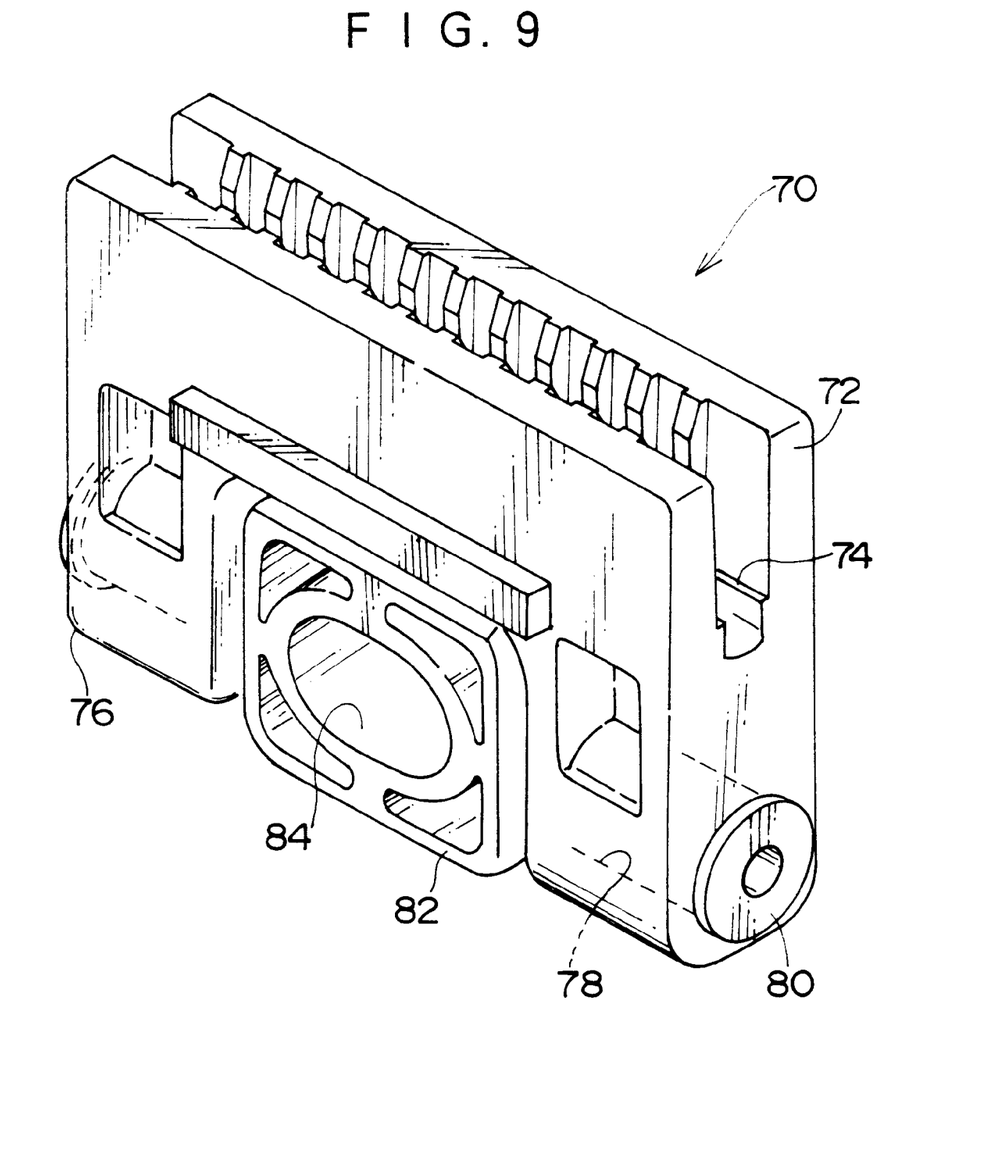
FIG. 9 is a perspective view of a glass holder relating to a second embodiment of the present invention.

FIGS. 6 and 9 illustrate a glass holder 70 relating to a second embodiment of the present invention.

In the glass holder 70, a holding ring 76 is provided at each end of a bottom plate 74 forming a holding member 72 which corresponds to the holding member 30 of the first embodiment (In the figures, the holding rings 76 are formed at the left and right ends of the bottom plate 74.) Shaft supporting holes 78 are formed substantially coaxially in the pair of holding rings 76. A shaft 80 is passed through the shaft supporting holes 78 so that the shaft 80 is rotatably supported by the holding rings 76. A mounting portion 82 is formed at the longitudinal direction central portion of the shaft 80. At least a portion of the outer configuration of the mounting portion 82 has a diameter which is greater than that of the shaft 80. A mounting hole 84 is formed in the center of the mounting portion 82. A mounting bolt is passed through the mounting hole 84 to mount the glass holder 70 to the roller guide 24 of the window regulator 22 (see FIG. 3). A receiving portion 86, which projects from the center of the holding member 72 (i.e., from the center in the left-to-right (right-to-left) direction in the figures), abuts the mounting portion 82. Because the load of the window glass is dispersed, damage to the shaft 80 is prevented.

In this way, because the mounting portion 82 is formed at the longitudinal direction center of the shaft 80 and the mounting hole 84 is formed in the mounting portion 82, the glass holder 70 is short. As a result, even if the glass holder 70 is used in an automobile having a small door panel, the glass holder 70 can be mounted to the window regulator 22 and the window glass 36 (see FIG. 3) can be held provided that there is a small space available for the glass holder 70.

What is claimed is:

1. A glass holder mounted to a raising/lowering member of a window regulator of an automobile and holding a window glass, said glass holder comprising:

a holding member that holds the window glass;

a mounting member adapted to be mounted to the raising/lowering member;

connecting means for connecting said holding member to said mounting member such that said holding member is rotatable with respect to said mounting member, wherein (1) said connecting means is a hinge mechanism that includes a plurality of rings provided on at least one of a lower surface of said holding member and an upper surface of said mounting member, and a shaft rotatably supported by said rings;

(2) a ring movement-preventing portion is provided at each end of said shaft, a diameter of said ring movement-preventing portion at each end being larger than an inner diameter of a respective outer ring to prevent said shaft from sliding in an axial direction thereof with respect to said plurality of rings, thereby eliminating movement of said rings relative to each other;

(3) said plurality of rings of said hinge mechanism is aligned in a longitudinal direction of said holding member and said mounting member, and comprises at least one upper ring fixed onto a lower surface of said holding member and at least one lower ring fixed onto an upper surface of said mounting member, (4) said at least one upper ring and said at least one lower ring are alternatively disposed such that upper rings are located between lower rings, receiving said shaft therein; and (5) a plurality of upper receiving portions, each of which is provided on the lower surface of said holding member at a position and in a shape corresponding to an upper surface of each lower ring, said upper rings imparting a portion of the load onto said shaft, and each upper receiving portion slidably contacting an upper surface of a corresponding lower ring such that said lower rings receive a portion of a load via said upper receiving portions.

2. A glass holder according to claim 1, wherein said ring movement-preventing portion at each end has a larger diameter than a diameter of said shaft.

3. A glass holder according to claim 1, further comprising lower receiving portions each being provided on the upper surface of said mounting member at a position and in a shape corresponding to a lower surface of each upper ring, said shaft imparting a portion of the load onto each lower ring, and each lower receiving portion slidably contacting a lower surface of a corresponding upper ring such that said upper rings receive a portion of a load via said lower receiving portions.

4. A glass holder according to claim 1, wherein said holding member has a holding portion that holds the window glass at a position apart from said connecting means.

5. A glass holder according to claim 1, wherein said hinge mechanism includes said plurality of rings being provided at one of said holding member and said mounting member, and said shaft being provided at the other of said holding member and said mounting member and inserted through said plurality of rings.

6. A glass holder according to claim 5, wherein said holding member has a holding portion that holds the window glass at a position apart from said connecting means.

7. A glass holder according to claims 6, wherein said mounting member extends in a direction moving away from said connecting means and has a mounting plate that is mounted to the raising/lowering member.

8. A glass holder according to claim 7, wherein said mounting plate has a mounting hole, and a mounting bolt that passes through said mounting hole and said raising/lowering member, thereby mounting said mounting member to said raising/lowering member.

9. A glass holder according to claim 8, wherein said plurality of rings are provided at said mounting member, and said glass holder further comprises upper receiving portions each provided on a lower surface of said holding member at a position and in a shape corresponding to an upper surface of each ring, each upper receiving portion slidably contacting the upper surface of a corresponding ring such that said plurality of rings receive a portion of a load via said upper receiving portions.

10. A glass holder according to claim 8, wherein said plurality of rings are provided at said holding member, and said glass holder further comprises lower receiving portions each provides on an upper surface of said mounting member at a position and in a shape corresponding to a lower surface of each ring, each lower receiving portion slidably contacting a corresponding lower surface of each ring such that said plurality of rings receive a portion of a load via said lower receiving portions.

11. A glass holder mounted to a raising/lowering member of a window regulator of an automobile and holding a window glass, said glass holder comprising:

a holding member that holds the window glass;

a plurality of holding rings provided on a base portion of said holding member; and a shaft passing through said plurality of holding rings so as to be rotatably supported by said holding member, wherein said shaft has a mounting portion homogeneously formed therewith and is fixed to the raising/lowering member via said mounting portion, and said holding member can be rotated relative to said shaft fixed onto the raising/lowering member.

12. A glass holder according to claim 11, wherein said mounting portion has a mounting hole being formed directly under a central portion of said holding member, and said shaft has a mounting bore, said mounting bore being formed at a corresponding position of said mounting hole and penetrating through said shaft in a direction normal to an axial direction of said shaft so as to intersect a central axis of said shaft, said mounting hole and said mounting bore being adapted to receive a mounting bolt there through and into said raising/lowering member, thereby fixedly mounting said shaft to said raising/lowering member.

13. A glass holder according to claim 11, further comprising receiving portions provided on the lower surface of said holding member at positions other than positions at which said holding rings are provided such that said upper receiving portions are located between said holding member and said shaft, each upper receiving portion having a shape corresponding to the shape of said shaft and slidably contacting said shaft such that said shaft receives a portion of a load via said receiving portions.

* * * * *